United States Patent [19]

Kalbe et al.

[11] Patent Number: 5,639,865
[45] Date of Patent: Jun. 17, 1997

[54] THERMOPLASTIC BIODEGRADABLE POLYSACCHARIDE DERIVATIVES, PROCESS FOR THE MANUFACTURE THEREOF AND USE THEREOF

[75] Inventors: Jochen Kalbe, Essen; Hanns-Peter Müller, Odenthal; Rainhard Koch, Köln; Jürgen Engelhardt; Wolfgang Koch, both of Bomlitz; Klaus Szablikowski, Walsrode; Gunter Weber, Fallingbostel, all of Germany

[73] Assignee: Wolff Walsrode Aktiengesellschaft, Walsrode, Germany

[21] Appl. No.: 385,863

[22] Filed: Feb. 9, 1995

[30] Foreign Application Priority Data

Feb. 16, 1994 [DE] Germany ............ 44 04 840.8

[51] Int. Cl.$^6$ ............ C08B 37/00; C07H 15/04; C07H 15/06
[52] U.S. Cl. ............ 536/18.5; 536/56; 536/84; 536/102; 536/111; 536/123.1; 536/123.12; 536/124; 536/126; 525/54.2; 428/413; 428/480
[58] Field of Search ............ 536/123.1, 123.12, 536/124, 126, 56, 58, 84, 102, 18.5; 428/364, 500; 525/54.2

[56] References Cited

U.S. PATENT DOCUMENTS

| Re. 29,915 | 2/1979 | Kroekel ............ 260/16 |
|---|---|---|
| 4,654,233 | 3/1987 | Grant et al. ............ 427/379 |
| 5,200,113 | 4/1993 | Finter et al. ............ 252/518 |
| 5,352,730 | 10/1994 | Lühmann et al. ............ 524/37 |
| 5,446,140 | 8/1995 | Maheras et al. ............ 536/123 |

FOREIGN PATENT DOCUMENTS

| 409781 | 1/1991 | European Pat. Off. . |
|---|---|---|
| 449041 | 10/1991 | European Pat. Off. . |
| 3607626 | 9/1987 | Germany . |
| 9220738 | 11/1992 | WIPO . |

OTHER PUBLICATIONS

Chemistry of Carbohydrates, Ed. Pigman et al., Academic Press, NY, pp. 552–557, (1948).

Gilmore et al., R., Soc. Chem., vol. 109, pp. 251–254, (1992) Abstract Only.

Penn et al., J. Macromol. Sci. Chem., vol. A16(2), pp. 473–479, (1981) Abstract Only.

Throckmorton et al. J. Am. Oil Chem. Soc., vol. 51(11), pp. 486–494, (1974) Abstract Only.

Primary Examiner—John Kight
Assistant Examiner—Howard C. Lee
Attorney, Agent, or Firm—Sprung Horn Kramer & Woods

[57] ABSTRACT

The present invention relates to novel thermoplastic, biodegradable polysaccharide ether esters, such as for example cellulose ether esters or starch ether esters, and to the production of such graft copolymers from polysaccharides, epoxides and dicarboxylic acid anhydrides and to the use thereof, for example as moldings, films or coatings.

8 Claims, No Drawings

THERMOPLASTIC BIODEGRADABLE POLYSACCHARIDE DERIVATIVES, PROCESS FOR THE MANUFACTURE THEREOF AND USE THEREOF

The present invention relates to novel thermoplastic, biodegradable polysaccharide ether esters, such as for example cellulose ether esters or starch ether esters, and to the production of such graft copolymers from polysaccharides, epoxides and dicarboxylic acid anhydrides and to the use thereof, for example as mouldings, films or coatings.

Cellulose ether esters described in the literature, such as for example tablet capsules resistant to gastric juices, consist of cellulose ethers, which are reacted in various processes with carboxylic acid anhydrides to yield their monoesters (see C. J. Malm, Analytical Chemistry, 25(2), 1953, 245–249; C. J. Malm, Industrial and Engineering Chemistry, 49(1), 1957, 84–88; EP 219 246 (06.10.86), DOS 2 140 996 (16.08.71)).

Depending upon requirements, various combinations of properties may be produced in these processes by varying the ether derivative, for example methyl-, ethyl-, hydroxyethyl-, hydroxypropyl-, propyl-, butylcellulose or also mixed ether types, such as methylhydroxyethyl- or methylhydroxypropylcellulose, or by selecting various dicarboxylic acid anhydrides, such as phthalic acid, tetrahydrophthalic acid, hexahydrophthalic acid or by varying the degree of substitution of these substituents (see DOS 2 140 996 (16.08.71)).

This class of products comprises lacquer systems for tablet encapsulation which may be applied from solution in organic solvents or water.

The biodegradability of a polysaccharide derivative is dependent upon the degree of substitution of each saccharide unit (see J. G. Batelaan in The Handbook of Environmental Chemistry, volume 3, part F, ed. O. Hutzinger, Springer-Verlag, 1992, 229–336; M. B. Wirick, Journal of Polymer Science, part A-1, 6 (1968), 1705–1718). Of all industrially available cellulose derivatives, it is thus only those with an average degree of substitution of less than 1.0 which are biodegradable. Thermoplasticity, in contrast, is achievable in known derivatives, such as for example cellulose acetate, only from a degree of substitution of over greater than 2.5 (T. Eicher, in Ullmanns Encyklopädie der technischen Chemie, 4th edition, 9, 1975, 227–246).

Slightly modified polysaccharides are generally readily biodegradable, but cannot fulfil technical requirements, such as for example extrudability in conventional extruders, water vapour resistance and impermeability to water, or mechanical properties comparable to those of standard plastics (K. Dotmann, Zuckerind. 116(7), 1991, 620–623).

Polysaccharide derivatives which are thermoplastic and are consequently extrudable into mouldings, such as for example films, and which are simultaneously fully biodegradable do not exist in described substances, except in the prior patent applications DE-A 4 228 376 and DE-A 4 317 231.

Synthesis of known polysaccharide dicarboxylic acid semi-esters proceeds in pyridine or acetic acid with basic salts such as sodium acetate as catalyst. The products may be separated from these solvents only with difficulty. Due to the promotion of corrosion by these solvents, specially designed plant is required for their synthesis. Syntheses in standard organic solvents would be advantageous for this purpose.

The object of the present invention is the synthesis of novel thermoplastic, extrudable and biodegradable polysaccharide ether esters by esterifying polysaccharides or polysaccharide ethers with dicarboxylic acid anhydrides, such as for example phthalic acid or hexahydrophthalic acid, to yield monoesters and subsequently reacting the free carboxyl group with alkylene oxides such as ethylene oxide or propylene oxide in standard organic solvents.

It is intended, by means of the subsequent esterification of the free carboxyl group with alkylene oxides to achieve thermal stability and thus extrudability of these polysaccharide derivatives. Biodegradability should also simultaneously be retained.

The present invention thus provides thermoplastic and biodegradable polysaccharide derivatives prepared from polysaccharides or polysaccharide ethers, which were reacted with cyclic dicarboxylic acid anhydrides and alkylene oxides, according to claim 1.

The present invention also provides a process for the production of such thermoplastic and biodegradable polysaccharide ether esters, which is characterised in that the polysaccharide or polysaccharide ether is activated with alkali hydroxide solution or organic tertiary amines or inorganic, basic salts and then esterified in suitable organic solvents or suspending agents with cyclic carboxylic acid anhydrides to yield the dicarboxylic acid semi-ester, which is then converted into the corresponding dicarboxylic acid diester with further alkylene oxide.

The polysaccharide ether esters to be produced according to the invention using this process may be described by the general structure:

Polysaccharide-O—R, wherein polysaccharide-O represents the substituted OH groups of a polymeric saccharide unit and R is either a monomeric and/or polymeric substituent of the structure X:

X=-A-B-A'- in which A and A' are a linear polyether chain of the following structure:

A=(-D-O)$_n$ and A'=(-D-O)$_m$H in which D means a linear aliphatic or aromatic branched or unbranched chain with 2 to 11 C atoms and n is an integer greater than or equal to 0, m is an integer greater than or equal to 1 and B is a dicarboxylic acid of the following structure:

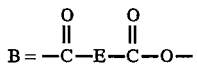

in which E is an aromatic or aliphatic carbon skeleton which may optionally be provided with further substituents, wherein the ratio of A' to B is greater than or equal to 0,1 or R is in accordance with the degree of substitution per saccharide unit with X, H (hydrogen) and/or alkyl with 1–4, preferably 1 or 2 C-atoms.

The polysaccharide is activated for the synthesis with alkali hydroxide solution. This activation may proceed via the synthesis and isolation of an alkali polysaccharide or alternatively by the production of an alkali polysaccharide moist with water or a suspension of the polysaccharide in water-miscible solvents and subsequent addition of an aqueous alkali solution.

Further activating treatments, such as for example with liquid ammonia or ultrasound may additionally be used for this purpose.

Before the beginning of the etherification and esterification reaction, the water and/or alkalipolysaccharide moist with solvent is subjected to solvent washing, by which means a defined alkali content may be achieved.

Activation may also be achieved by spraying with an aqueous alkali hydroxide solution. The epoxide is grafted onto the cellulose activated in this manner and the water present in the reaction batch preferably distilled off before the reaction with the dicarboxylic acid anhydride.

The reaction with the dicarboxylic acid anhydrides is performed in suspending agents. It may be regarded as surprising in this connection that the dicarboxylic acid anhydride reacts in a two-phase reaction (liquid-solid) with the polysaccharide in standard organic solvents, as comparable reactions could only be performed in activating and strongly swelling solvents such as acetic acid and pyridine.

As an alternative to activation with alkali hydroxide solution, the reaction of the polysaccharide with the dicarboxylic acid anhydride may also be performed with organic amines. To this end, the polysaccharide or the alkali-free cellulose ether is stirred up with the suspending agent with the amine as catalyst and the dicarboxylic acid anhydride is added to this suspension or solution. This results in the dicarboxylic acid monoester of the polysaccharide or polysaccharide ether.

In suspending agents such as DMSO, DMAc or DMF, the product passes into solution during the reaction with the dicarboxylic acid anhydride.

In the next stage, the still free carboxyl group of the dicarboxylic acid monoester obtained in this manner is reacted with alkylene oxides. The quantity ratios may here be selected such that the free carboxylic acids are completely or only partially reacted with alkylene oxide. The free acid groups may also act as initiators for a polymeric ether synthesis.

If amine was used for activation, it also acts as catalyst in this reaction stage. Accordingly, in the case of alkali activation, small quantities of amine may be added.

The polysaccharide ether esters so produced are completely dissolved in the suspending agent or solvent, they may be isolated by distillation or precipitation in non-solvents such as for example water or isopropanol.

Due to the numerous possibilities for combination of the substituents at various degrees of substitution, the properties of the polysaccharide ether esters may be varied over a wide range. Thus, for example, the melting range may be adjusted between 80° and 250° C.

This widely adjustable melting range is surprising and was not predictable by the person skilled in the art since known polysaccharide dicarboxylic acid semi-esters, such as for example cellulose acetate phthalate or methyl hydroxypropylphthalate melt with slow decomposition at temperatures of greater than 180° C. and hydroxyalkylpolysaccharides, such as hydroxypropylcellulose have melting ranges between 180° and 200° C. only at high degrees of substitution.

Due to the esterification of the free carboxyl group, these polysaccharide derivatives are, in contrast to previously known dicarboxylic acid semi-esters, thermally stable and readily extrudable.

Further adjustable parameters are solubility behaviour, water vapour permeability and melt viscosity.

Industrially available cellulose, such as for example wood cellulose and cotton linters of any desired molecular weight, or other products containing cellulose, such as for example sawdust, are suitable for the synthesis. Also suitable are native and soluble starches of any desired origin or pretreatment, together with amylose, amylopectin, alginate, glycogen, carrageenate, chitin, chitosan, guar flour, locust bean flour, pectin, xylan, xanthan, pullulan, dextran and laevan.

In order to adjust the molecular weight during the treatment with alkali hydroxides, it is possible here to perform oxidative chain degradation with atmospheric oxygen using known processes, with cellulose, any desired fibre lengths may be used, preferably shorter than 2000 µm, particularly preferably shorter than 1000 µm.

If polysaccharide ethers, in particular cellulose ethers, are used, suitable substances are cellulose ethers such as methylcellulose or ethylcellulose or benzylcellulose with an average degree of substitution of less than or equal to 2.5, hydroxyethylcellulose, hydroxypropylcellulose, dihydroxypropylcellulose, hydroxybutylcellulose, methylhydroxyethylcellulose, methylhydroxypropylcellulose, methylhydroxybutylcellulose, ethylhydroxypropylcellulose, ethylhydroxyethylcellulose, carboxyalkylcellulose, sulphoalkylcellulose, cyanoethylcellulose and the mixed ethers thereof.

Suitable suspending agents or solvents are ketones, ethers and cyclic ethers, acetals, hydrocarbons and polar aprotic compounds such as dimethyl sulphoxide, dimethylformamide, dimethylacetamide, dioxane, tetrahydrofuran, N-methylmorpholine, N-methylpyrrolidone, dimethoxyethane, dimethoxymethane, dimethyl ether, diethylene glycol dimethyl ether.

Suitable dicarboxylic acid anhydrides are anhydrides such as phthalic anhydride, tetrahydrophthalic anhydride, hexahydrophthalic anhydride, maleic anhydride, succinic anhydride, trimellitic anhydride and isatic acid anhydride.

Furthermore suitable are alkane and alkene succinic acid anhydride such as hexyl-, hexenyl-, octyl-, octenyl-, nonyl-, nonenyl-, decyl-, decenyl-, dodecyl-, dodecenyl-, tetradecyl-, tetradecenyl-, hexadecyl-, hexadecenyl- octadecyl-, octadecenyl-, iso-octadecyl, iso-octadecenyl-, cicosyl- and docoxyl succinic acid anhydride.

Suitable epoxides are preferably monoepoxides such as ethylene oxide, propylene oxide, 1,2-epoxybutane, 1,2-epoxyhexane, 1,2-epoxyoctane, 1,2-epoxydecane, 1,2-epoxydodecane, 1,2-epoxyhexadecane, 1,2-epoxyoctadecane, stearic acid glycidyl ether, epoxy butyl stearate, lauryl glycidyl ether, glycidyl methyl ether, glycidyl ethyl ether, glycidyl propyl ether, glycidyl butyl ether, glycidyl tert.-butyl ether, glycidyl acrylate, glycidyl methacrylate, allyl glycidyl ether, butadiene monoxide, glycidol, 3-glycidoxypropyltrimethoxysilane, 3-glycidoxypropyltriethoxysilane, di-N-butylamino-2,3-epoxypropane, diethyl-$\beta$,$\gamma$-epoxypropyl phosphate, 4-(2,3-epoxypropyl)morpholine, styrene oxide and phenoxypropylene oxide.

The polysaccharide is activated with alkali hydroxide solution. Various methods may be used to this end.

Firstly, the alkali cellulose may be produced by treating the cellulose with aqueous alkali hydroxide solution (mash alkalisation), followed by filtration and drying. The concentration of the sodium hydroxide solution is here 5–50 wt. %, preferably 10–25 wt. %. The alkali content of the alkali cellulose produced in this manner is 0.1 to 30 wt. %, preferably 1–15 wt. %.

Alternatively, the polysaccharide may be treated with aqueous alkali hydroxide solution in a suspension of the polysaccharide in organic suspending agents, such as for example alcohols or ketones or ethers (slurry process).

Alkali polysaccharides prepared using both mash alkalisation and the slurry process may be extracted with solvents/ solvent mixtures as described in EP 0 093 368. Unbound alkali and excess water may in this way be removed from the alkali polysaccharide.

Alternatively, the polysaccharide may be treated with aqueous alkali directly in the stirred autoclave and the reaction with the epoxide performed immediately subsequently. For the reaction with the dicarboxylic acid anhydride, the water present in the reaction batch is preferably distilled off and the alkali polysaccharide suspended in the particular solvent used.

As an alternative to activation with alkali hydroxide solution, the polysaccharide may be activated with tertiary organic amines or also with inorganic basic salts.

Suitable amines are tertiary organic amines such as trimethylamine, triethylamine, tributylamine, tetramethylenediamine, pyridine, N,N-dimethylcyclohexyldiamine, N,N-dimethylbenzylamine, 4-pyrrolidinopyridine, permethyldiethylenetriamine, 1,4-diazabicyclo(2.2.2)-octane, 1,8-diazabicyclo(5.4.0)undec-7-ene, 1,5-diazabicyclo(4.3.0)non-5-ene together with any desired mixtures thereof.

The quantity of amine to be used here is dependent upon the initial degree of derivativisation of the polysaccharide. If the polysaccharide is used derivativised, for example as a hydroxyethyl or hydroxypropyl derivative, catalytic quantities of amine are sufficient for the reaction. For reaction with the native polysaccharide, the amine is used in a molar ratio to the polysaccharide of 0.1 to 5, preferably of 0.5 to 3.

If basic salts are used as the catalyst, salts such as sodium carbonate, sodium acetate, potassium carbonate, potassium acetate and lithium carbonate are suitable for this purpose.

The catalysts or activators used for the reaction of the polysaccharide/polysaccharide derivative are also used for the reaction of the carboxylic acid with the alkylene oxides.

The reaction temperature for the reaction of the polysaccharide with the epoxide is 20° to 150° C., preferably 50° to 120° C. Reaction times are 0.5 to 5 h, preferably 0.5 to 1 hour.

The alkaline or amine-activated cellulose ether reacts with the dicarboxylic acid anhydride at a temperature of 30° to 15° C., preferably 50° to 120° C. Reaction times are 0.5 to 4 hours, preferably 0.5 to 2 hours.

The intermediate polysaccharide dicarboxylic acid semiester reacts with the alkylene oxide at a temperature of 20° to 150° C., preferably 40° to 130° C., particularly preferably 50° to 120° C. Reaction times are 0.5 to 16 hours, preferably 0.5 to 8 hours, particularly preferably 0.5 to 4 hours.

The polysaccharide ether esters produced using the process according to the invention and described according to the invention are soluble in organic solvents such as DMSO, DMAc, DMF, dioxane, THF or n-butanol.

These compounds are moreover thermoplastic and may be converted, for example, into injection mouldings or films using conventional processing techniques such as extrusion.

The polysaccharide derivatives according to the invention are suitable for the production of biodegradable films, pots, bottles and other mouldings. Their properties may be varied by producing blends of any desired composition with other biodegradable components, such as for example starch, cellulose, poly(lactide-glycolide), polyhydroxybutyric acid, polyhydroxyvaleric acid, polyhydroxycaproic acid, polyesteramides or polyesterurethanes. Combination with plasticisers is also possible.

These polysaccharide derivatives are biodegradable. Biodegradability here is independent of the degree of substitution with dicarboxylic acid ester. This is utterly surprising since in all known polysaccharide derivatives, biodegradability falls as the degree of substitution rises.

The polysaccharide ether esters according to the invention are distinguished from known polysaccharide dicarboxylic acid semi-esters by a series of advantages:

They may be synthesised using simple prior art stirred autoclaves.

Segmented synthesis of the novel polysaccharide ether esters may be achieved in a single reaction vessel.

Derivativisation may be performed in standard organic solvents, wherein the resultant polysaccharide derivative is dissolved.

The derivatives may be obtained as a free-flowing, powder with a widely adjustable melting range.

The free-flowing powders may be processed as thermoplastics in conventional extruders.

High quality films and mouldings may be produced economically.

The films and mouldings are odourless, water resistant and fulfil all the requirements placed upon the performance of conventional materials.

The resultant films and mouldings are biodegradable.

The property of biodegradability is investigated as follows:

100 mg portions of the polysaccharide ether ester are weighed out into two centrifuge tubes. 2.5 ml of 0.3M potassium phosphate buffer, pH 6.0, and 2.5 ml of 0.3M sodium acetate buffer, pH 6.0, are then added in succession. Commercially available cellulases, esterases, amylases and lipases from various organisms are mixed together and dissolved in the above-stated buffer. The enzyme mixture is added to each of the tubes, so starting incubation. The tubes are incubated on a shaker at 30° C. for several hours. The polymer is then centrifuged out and a sample taken from the supernatant, and the quantity of reducing sugars in the sample is determined.

The reducing ends are detected as follows:

9 parts of 0.5M NaOH are added to one part of 2.5 g of 4-hydroxybenzoic acid hydrazide in 50 ml of 0.5M HCl. 3 ml of this solution are incubated with 0.1 ml of the solution to be analysed containing sugar for 5 minutes in boiling water. The absorbance of the solution at 410 nm is determined against water.

The quantity of reducing ends generated by enzyme activity is determined (as glucose) by means of a calibration curve prepared using glucose. The value has to be corrected by the value obtained from the control without enzyme. A substrate is classed as degradable if the same rate of glucose release is found as for wood cellulose (20 µg glucose/ml⁻h).

Test to determine compostability:

The compounds to be tested are fixed as films in 6×6 photographic slide mounts and dried to constant weight at 80° C. They are then placed in a suitable crate in a 2 cm deep mixture of shredded cut flowers (1 part, w/w) and thoroughly rotted garden compost (2 parts, w/w).

In order to achieve elevated air humidity, crystallising dishes filled with water are placed on the compost mixture. The filled crates are then each incubated in a incubator for successive four week periods at 60°, 50° and 37° C. Water losses are determined by weight loss and made good. The pH of the compost is measured regularly during incubation. If the value measured differs by more than one unit from pH 7, the water loss is made good with 100 mM potassium phosphate, pH 7.0. After each 4 week period, a batch is opened, the films taken out, cleaned, dried to constant weight at 80° C. and photographed. Immediately after drying, the weight loss of the film is determined by reweighing.

In the poisoned control, the entire batch is dried at 105° C. and the water evaporated on drying then replaced with a 0.1% $HgCl_2$ solution. Before being placed in the compost mixture, the samples for the poisoned control are introduced into the $HgCl_2$ solution and then dried. The control batch is incubated in exactly the same manner as the batches for testing. A substance is then classed as degradable if, after 12 weeks, no remains of the sample may be found in the unpoisoned batch, while the sample in the poisoned batch is unchanged.

The novel polysaccharide polyether esters according to the invention are suitable for the production of mouldings, for example bottles, plant pots, disposable cutlery and crockery, golf tees, packaging films for foodstuffs and biowaste, mulch films, nappies etc. They are also suitable for coating flat structures, such as for example paper, nonwoven, woven, knitted fabrics or other substrates or also for the production of fibres, blends and laminates. Such materials are also, for example, amenable to paper recycling.

The following examples are intended to illustrate the subject matter of the present invention in greater detail.

EXAMPLES

Example 1

10.77 g of hydroxypropylcellulose (MS=0.92) are stirred in 300 g of dioxane with 0.2 ml of 1,8-diazabicyclo(5.4.0)-undec-7-ene at 60° C. for 0.5 hours. 37 g of phthalic anhydride dissolved in 50 g of dioxane are then added dropwise to this suspension and stirred for 1 hour at 60° C. The reaction batch is heated to 80° C. 43.5 g of propylene oxide are added dropwise and the mixture stirred for 4 hours at 80° C. A solution of the cellulose ether ester in dioxane is produced in this manner. The solution is then stirred into 1.5 l of isopropanol and the precipitated product filtered and washed with isopropanol. The softening point is 130° C. The degree of substitution determined by solid-state NMR is 1.7 mol of phthalic acid and 2.75 mol of propyl groups per glucose unit. In the enzyme test, a glucose release rate of 85.19 µg glucose/ml$^{-h}$ is found for the sample preincubated at 60° C. In the composting test, the sample is completely degraded after four weeks.

Example 2

9.68 g of hydroxyethylcellulose (MS=0.72) are stirred in 300 g of dimethyl sulphoxide with 0.2 ml of 1,8-diazabicyclo(5.4.0)undec-7-ene at 60° C. for 0.5 hours. 37 g of phthalic anhydride dissolved in 50 g of dimethyl sulphoxide are then added dropwise to this suspension and stirred for 1 hour at 60° C. The reaction batch is heated to 80° C. 43.5 g of propylene oxide are added dropwise and the mixture stirred for 4 hours at 80° C. A solution of the cellulose ether ester in dimethyl sulphoxide is produced in this manner. The solution is then stirred into 1.5 l of isopropanol and the precipitated product filtered and washed with isopropanol. The softening point is 110° C. The degree of substitution determined by solid-state NMR is 2.0 mol of phthalic acid and 2.3 mol of propyl groups per glucose unit. In the enzyme test, a glucose release rate of 80.1 µg glucose/ml$^{-h}$ is found for the sample preincubated at 60° C. In the composting test, the sample is completely degraded after four weeks.

Example 3

8.1 g of wheat starch and 15.15 g of triethylamine are stirred in 300 g of dimethyl sulphoxide at 60° C. for 0.5 hours. 37 g of phthalic anhydride dissolved in 50 g of dimethyl sulphoxide are then added dropwise and the mixture stirred for 1 hour at 60° C. The reaction batch is heated to 80° C. and 43.5 g of propylene oxide are added dropwise and the mixture stirred for 1 hour at 80° C. The solution is then stirred into 1.5 l of acetone and the precipitated product filtered and washed with acetone. The softening point is 155° C. The degree of substitution determined by solid-state NMR is 2.3 mol of phthalic acid and 1.01 mol of propyl groups per glucose unit. In the enzyme test, a glucose release rate of 91.25 µg glucose/ml$^{-h}$ is found for the sample preincubated at 60° C. In the composting test, the sample is completely degraded after four weeks.

Example 4

8.1 g of cotton linters and 15.15 g of triethylamine are stirred in 300 g of dimethyl sulphoxide at 60° C. for 0.5 hours. 38.5 g of hexahydrophthalic anhydride dissolved in 50 g of dimethyl sulphoxide are then added dropwise and the mixture stirred for 2 hours at 60° C. The reaction batch is heated to 80° C. and 43.5 g of propylene oxide are added dropwise and the mixture stirred for 1 hour at 80° C. The solution is then stirred into 1.5 l of isopropanol and the precipitated product filtered and washed with isopropanol. The melting point is 120° C. The degree of substitution determined by solid-state NMR is 3.0 mol of hexahydrophthalic acid and 3.0 mol of propyl groups per glucose unit. In the enzyme test, a glucose release rate of 70.6 µg glucose/ml$^{-h}$ is found for the sample preincubated at 60° C. In the composting test, the sample is completely degraded after four weeks.

Example 5

1084 g of cotton liners are alkalised in 22.5 l of isopropanol and 2.5 l of water and 0.63 kg of NaOH pellets for 90 minutes at 25° C. The mixture is then washed with 10 l of isopropanol/water (80/20) and centrifuged and again stirred with 10 l of isopropanol and centrifuged. The alkali cellulose produced in this manner has an alkali content of 6.8%.

49 g of ethylene oxide are added under a nitrogen atmosphere to 130.1 g of the alkali cellulose obtained in this manner in a stirred autoclave and the mixture stirred for 1.5 hours at 50° C. 1000 ml of dimethylacetamide and 205 g of tetrahydrophthalic acid are then added to the reaction batch and the batch stirred for 1.5 hours at 60° C. The reaction batch is heated to 80° C. and 215 g of propylene oxide added dropwise and the mixture stirred for 1 hour at 80° C. The solution is then stirred into 10 l of isopropanol and the precipitated product filtered and washed with isopropanol. The softening point is 160° C. The degree of substitution determined by solid-state NMR is 2.2 mol of tetrahydrophthalic acid and 1.8 mol of propyl groups per glucose unit. In the enzyme test, a glucose release rate of 68.83 µg glucose/ml$^{-h}$ is found for the sample preincubated at 60° C. In the composting test, the sample is completely degraded after four weeks.

We claim:

1. A thermoplastic, biodegradable polysaccharide ether ester of the formula

Polysaccharide—O—R wherein polysaccharide-O represents the substituted OH groups of a polymeric saccharide unit and R is either:

i) a monomeric or a polymeric substituent of the formula:

—A—B—A' wherein
A is linear polyether chain of the formula $(-D-O)_m$,

A' is a linear polyether chain of the formula $(-D-O)_mH$,

D is a linear aliphatic or a aromatic branched or unbranched chain with 2 to 11 carbon atoms,
n is an integer greater than or equal to 0,
m is an integer greater than or equal to 1,
B is a radical of the formula $$-\overset{O}{\underset{\|}{C}}-E-\overset{O}{\underset{\|}{C}}-O-,$$

E is a substituted or unsubstituted aromatic or aliphatic radical
where the ratio of A' to B is greater than or equal to 0.1, or ii) is hydrogen or $C_1$–$C_4$-alkyl according to the total degrees of substitution per saccharide unit with —A—B—A'.

2. The saccharide ether ester according to claim 1, wherein the polysaccharide ether ester is an ether ester selected from the group consisting of amylose, amylopectin, aliginate, glycogen, carrageenate, chitin, chitosan, guar flour, locust bean flour, pectin, xylan, xanthan, pullulan, dextran and levan.

3. The saccharide ether ester according to claim 1, wherein the polysaccharide ether ester is a cellulose ether ester selected from the group consisting of hydroxyethylcellulose, hydroxypropylcetlulose, dihydroxypropylcellulose, hydroxybutylcellulose, methylhydroxyethylcellulose, methylhydroxypropylcellulose, methylhydroxybutylcellulose, ethylhydroxypropylcellulose, ethylhydroxyethylcellulose, carboxyalkylcellulose, sulphoalkylcellulose, cyanoethylcellulose and the mixed others thereof.

4. A thermoplastic and biodegradable polysaccharide ether ester according to claim 1, having 0.1 to 6.5 mols of alkyl ether and 0.1 to 3.0 mols of dicarboxylic acid ester per mol of polysaccharide units.

5. A molding, film, fiber, coating, blend or laminate containing at least 10% by weight of polysaccharide ether ester according to claim 1.

6. A process for the production of a thermoplastic and biodegradable polysaccharide ether ester according to claim 1, which comprises activating a polysaccharide or polysaccharide derivative with a member selected from the group consisting of an alkali hydroxide solution, an organic tertiary amine or an inorganic basic salt, and then reacting the activated material in a suspending agent or solvent first with a dicarboxylic acid anhydride and then with an epoxide.

7. A process according to claim 1, wherein the activation is effected with a member selected from the group consisting of aqueous NaOH or a mixture of aqueous NaOH with a water-soluble organic solvent, a tertiary organic amine in an organic solvent or an inorganic basic salt in an organic solvent.

8. A process according to claim 6, including the further step of recovering the polysaccharide ether ester by (a) precipitation in water or an organic solvent or (b) by elimination of the reaction solution.

* * * * *

UNITED STATES PATENT AND TRADEMARK OFFICE
CERTIFICATE OF CORRECTION

PATENT NO.  : 5,639,865
DATED       : June 17, 1997
INVENTOR(S) : Kalbe, et al.

It is certified that error appears in the above-indentified patent and that said Letters Patent is hereby corrected as shown below:

Col. 10, line 1    Delete " hydroxypropylcetlulose " and substitute -- hydroxypropylcellulose --

Col. 10, line 26   Delete claim " 1 " and substitute --6 --

Signed and Sealed this

Third Day of February, 1998

*Attest:*

BRUCE LEHMAN

*Attesting Officer*   Commissioner of Patents and Trademarks